United States Patent
Qian et al.

(10) Patent No.: US 11,117,832 B2
(45) Date of Patent: Sep. 14, 2021

(54) FLUORESCENT POLYCARBOXYLATE SUPERPLASTICIZER AND PREPARATION METHOD THEREOF

(71) Applicant: Jiangsu ARIT New Materials CO.,LTD., Nanjing (CN)

(72) Inventors: Shanshan Qian, Nanjing (CN); Chunyang Zheng, Nanjing (CN); Chunman Huang, Nanjing (CN); Haidong Jiang, Nanjing (CN); Yangcheng Hu, Nanjing (CN); Wei Li, Nanjing (CN); Jiezhong Gan, Nanjing (CN)

(73) Assignee: Jiangsu ARIT New Materials CO., LTD., Nanjing (CN)

( * ) Notice: Subject to any disclaimer, the term of this patent is extended or adjusted under 35 U.S.C. 154(b) by 208 days.

(21) Appl. No.: 16/521,599

(22) Filed: Jul. 25, 2019

(65) Prior Publication Data
US 2020/0299191 A1 Sep. 24, 2020

(30) Foreign Application Priority Data
Mar. 19, 2019 (CN) .......................... 201910208217.4

(51) Int. Cl.
| | | |
|---|---|---|
| *C04B 24/26* | (2006.01) | |
| *C08F 299/02* | (2006.01) | |
| *C04B 103/00* | (2006.01) | |
| *C04B 103/54* | (2006.01) | |
| *C04B 103/32* | (2006.01) | |

(52) U.S. Cl.
CPC ...... *C04B 24/2694* (2013.01); *C08F 299/026* (2013.01); *C04B 2103/0061* (2013.01); *C04B 2103/32* (2013.01); *C04B 2103/54* (2013.01); *C08F 2810/00* (2013.01)

(58) Field of Classification Search
CPC .......................... C08F 290/062; C04B 24/2694
See application file for complete search history.

(56) References Cited

FOREIGN PATENT DOCUMENTS

| CN | 1587162 A | 3/2005 |
|---|---|---|
| CN | 107383284 A | 11/2017 |

*Primary Examiner* — Mark S Kaucher
(74) *Attorney, Agent, or Firm* — Bayramoglu Law Offices LLC

(57) ABSTRACT

A fluorescent polycarboxylate superplasticizer and a preparation method thereof. The preparation process of the polycarboxylate superplasticizer is as follows. Firstly, a redox radical polymerization is performed on a monomer of an unsaturated acid and a derivative thereof, and an unsaturated polyether monomer to form a polycarboxylate superplasticizer pre-product. Then, the polycarboxylate superplasticizer pre-product is subjected to an esterification reaction with an organic molecule having a fluorescent property to obtain the fluorescent polycarboxylate superplasticizer. The method effectively reduces the reaction difficulty and makes the reaction rapid and efficient. The fluorescent polycarboxylate superplasticizer is non-toxic and non-polluting, and has good controllability in the production process and less side reactions. The fluorescent polycarboxylate superplasticizer can be applied to different kinds of cement, having a high water-reducing rate, and a relatively high cost performance and competitive advantage.

7 Claims, 1 Drawing Sheet

FLUORESCENT POLYCARBOXYLATE SUPERPLASTICIZER AND PREPARATION METHOD THEREOF

CROSS REFERENCE TO THE RELATED APPLICATIONS

This application is based upon and claims priority to Chinese Patent Application No. 201910208217.4, filed on Mar. 19, 2019, the entire contents of which are incorporated herein by reference.

TECHNICAL FIELD

The present invention relates to the technical field of polycarboxylate superplasticizers for cement concrete, in particular to a method for preparing a fluorescent polycarboxylate superplasticizer by combining a redox radical polymerization reaction and an esterification reaction.

BACKGROUND

The Patent (application No.: CN201710458500.3) discloses an ultraviolet and fluorescent dual-tracing concrete admixture. The ultraviolet and fluorescent dual-tracing concrete admixture is obtained by a radical polymerization of an allyloxy polyvinyl ether monomer or an end-capping allyloxy polyvinyl ether monomer, an unsaturated carboxylic acid monomer or an unsaturated carboxylic acid anhydride monomer, and a water-soluble fluorescent monomer containing an unsaturated double bond. The raw materials for synthesizing the polymer are non-toxic and harmless, which meets the characteristics of clean production. When used as a polycarboxylate superplasticizer, the polymer of this invention can be further conductive to accurately and efficiently determine an internal filling condition of the concrete and conditions of empty drum and cracking. However, the synthesis process of the polymer is complicated. Moreover, the raw materials for synthesizing the polymer contain halogen elements, which corrodes the steel bars and affects the durability of the concrete.

The Patent (application No.: CN200410080257.9) discloses a luminescent reflective concrete floor tile and a production method thereof. First, cement, sand, concrete admixture and water are mixed according to a ratio of preparing ordinary concrete, and then stirred uniformly and poured into a mold for vibration and compaction to obtain a base layer. Second, 5-30% of cement, 60-85% of graded glass beads, 0-5% of luminescent powder, 0-5% of toner, 0.1-6% of concrete admixture, 0%-3% of redispersible polymer powder are stirred evenly with water to obtain a mixture, and the mixture is poured on the base layer freshly formed in the above step to form a luminescent reflective surface layer. Third, the vibration and compaction is performed to coagulate the concrete base layer and the luminescent reflective surface layer containing the glass beads to form an overall body; and after demoulding, maintenance is performed on the overall body, and the prefabricated luminescent reflective concrete floor tiles are produced in the factory. This invention may be applied in prefabrication in the factory or manufacturing at the construction site. The luminescent reflective concrete floor tile can be widely used in places requiring night light or fluorescence for indications or warnings, such as highways, roads, playgrounds, warehouses, buildings, etc., and can also beautify the city's night scenes. However, this application does not relate to research on fluorescent polycarboxylate superplasticizers.

At present, most of the marking and luminescent concrete are fluorescent paints, but the service life thereof is short. Moreover, the fluorescent paint is not the best choice for the harsh working environment of a road. The present invention provides a fluorescent polycarboxylate superplasticizer. The fluorescent polycarboxylate superplasticizer is added into concrete, which can absorb light during the daytime and emit fluorescence at night, thereby reminding people to pay attention to safety in dangerous roads. The fluorescent polycarboxylate superplasticizer of the present invention is added in the process of concrete production. The obtained concrete can be used in places requiring night light or fluorescence for indications or warnings, such as highways, roads, playgrounds, warehouses, buildings, etc., can also beautify the city's night scenes, and emit light at night to remind pedestrians and vehicles to reduce the occurrence of security incidents.

SUMMARY

The objective of the present invention is to overcome the deficiencies in the prior art. The present invention provides a fluorescent polycarboxylate superplasticizer and a preparation method thereof. A polycarboxylate superplasticizer produced by this method possesses new functions. A concrete produced with the fluorescent polycarboxylate superplasticizer can emit light at night to alert pedestrians and vehicles, thereby reducing the occurrence of security incidents.

Technical solution: In order to achieve the above objective, the present invention provides a fluorescent polycarboxylate superplasticizer having the following structural formula:

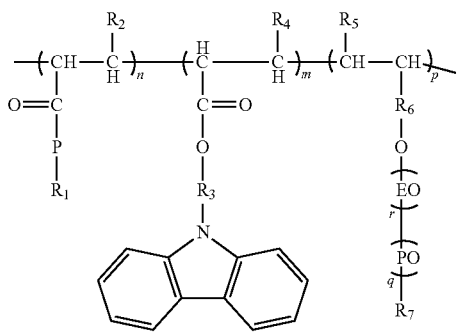

in the structural formula, P is N, NH or O; $R_1$ is at least one selected from the group consisting of H, an alkali metal ion, an aliphatic group, an alicyclic group and an aromatic group; R2, R4, R5, and R7 are respectively at least one item selected from the group consisting of H, an aliphatic group, an alicyclic group and an aromatic group; R3, R6 are at least one item selected from the group consisting of an aliphatic group, an alicyclic group and an aromatic group; r, q, the degree of polymerization, respectively ranges from 9 to 200, and n, m, p, the degree of polymerization, respectively ranges from 10 to 100.

Preferably, the polycarboxylate superplasticizer has a weight-average molecular weight ranging from 20,000 to 80,000.

The present invention provides a preparation method of a fluorescent polycarboxylate superplasticizer, including the following steps:

1) performing a redox radical polymerization reaction on a monomer of an unsaturated acid and a derivative thereof, and an unsaturated polyether monomer at a temperature of 5-45° C. for 3-5 hours under a combined action of an initiator, a reducing agent and a chain transfer agent to obtain a polycarboxylate superplasticizer pre-product; wherein, a molar ratio of the unsaturated polyether monomer, the monomer of the unsaturated acid and the derivative thereof, the initiator, the reducing agent and the chain transfer agent is 1:(2-6):(0.01-0.1):(0.02-0.2):(0.03-0.1); and 2) performing an esterification reaction on the polycarboxylate superplasticizer pre-product and an organic molecule having a fluorescent property under an action of a catalyst for 3-5 hours, then adjusting a pH to 6-7 with an alkali solution, and adding water to obtain a fluorescent polycarboxylate superplasticizer with a concentration of 5%-60% by weight; wherein, a molar ratio of the polycarboxylate superplasticizer pre-product, the organic molecule having the fluorescent property, and the catalyst is 1:(1-10):(0.01-0.1).

Preferably, the unsaturated polyether monomer in the step 1) is at least one item selected from the group consisting of allyl polyethylene glycol, methallyl polyethylene glycol, 3-methyl-3-butene-1-polyethylene glycol, 2-methylallyl polyethylene glycol, methoxy polyethylene glycol methacrylate, methoxy polyethylene glycol acrylate, polyethylene glycol monoacrylate, and polyethylene glycol methacrylate, and has a weight-average molecular weight of 300-8000.

Preferably, the monomer of the unsaturated acid and the derivative thereof in the step 1) is at least one item selected from the group consisting of acrylic acid, methacrylic acid, sodium acrylate, sodium methacrylate, acrylamide, methacrylamide, potassium acrylate, potassium methacrylate, and 4-vinylbenzoic acid.

Preferably, in the step 1), the initiator is at least one item selected from the group consisting of hydrogen peroxide, ammonium persulfate, sodium persulfate, and potassium persulfate; the reducing agent is at least one item selected from the group consisting of sodium formaldehyde sulfoxylate, sodium sulfite, sodium metabisulfite, sodium hydrogen sulfite, ferrous pyrophosphate, ferrous sulfate, sodium hypophosphite, and sodium ascorbate; and the chain transfer agent is at least one item selected from the group consisting of thioglycolic acid, mercaptoethanol, 2-mercaptopropionic acid, 3-mercaptopropionic acid, sodium methyl propenyl sulfonate, and dodecyl mercaptan.

Preferably, the organic molecule having the fluorescent property in the step 2) is at least one item selected from the group consisting of N-(hydroxymethyl) carbazole, N-(hydroxyethyl) carbazole, 9-(p-hydroxymethyl) phenyl carbazole, 9-(o-hydroxymethyl) phenyl carbazole, 9-(m-hydroxymethyl) phenyl carbazole, (4-carbazole-9-methyl-cyclohexyl)-methanol, (3-carbazole-9-methyl-cyclohexyl)-methanol, and (2-carbazole-9-methyl-cyclohexyl)-methanol.

Preferably, the catalyst in the step 2) is at least one item selected from the group consisting of solid acid, concentrated sulfuric acid, p-toluenesulfonic acid, tetrabutyl titanate, dicyclohexylcarbodiimide/4-dimethylaminopyridine (DCC/DMAP), and trifluoromethanesulfonic acid.

Preferably, the alkali solution in the step 2) is at least one item selected from the group consisting of potassium hydroxide, sodium hydroxide, and calcium hydroxide.

Beneficial effects: compared with the prior art, the present invention has the following advantages:

(1) The fluorescent polycarboxylate superplasticizer prepared by the method of the present invention retains the advantages of the existing polycarboxylate superplasticizers. Moreover, the production process is simple, and the safety and controllability are excellent, thus the cost performance and competitive advantage are relatively good;

(2) According to the method of preparing the fluorescent polycarboxylate superplasticizer of the present invention, the difficulty of the reaction can be effectively reduced due to the esterification reaction;

(3) The concrete produced by using the fluorescent polycarboxylate superplasticizer prepared by the method of the present invention can emit light at night to alert pedestrians and vehicles, reducing the occurrence of safety accidents;

(4) The preparation method of the fluorescent polycarboxylate superplasticizer of the present invention is rapid and efficient, non-toxic and non-polluting, and has a simple operation; and (5) The concrete mixed with the fluorescent polycarboxylate superplasticizer prepared by the present invention not only has the characteristics of pressure resistance and heat preservation of the traditional building materials, but also has the fluorescent property, so that the characteristics of the concrete are further expanded.

DETAILED DESCRIPTION OF THE EMBODIMENTS

Embodiment 1

Figure 1:
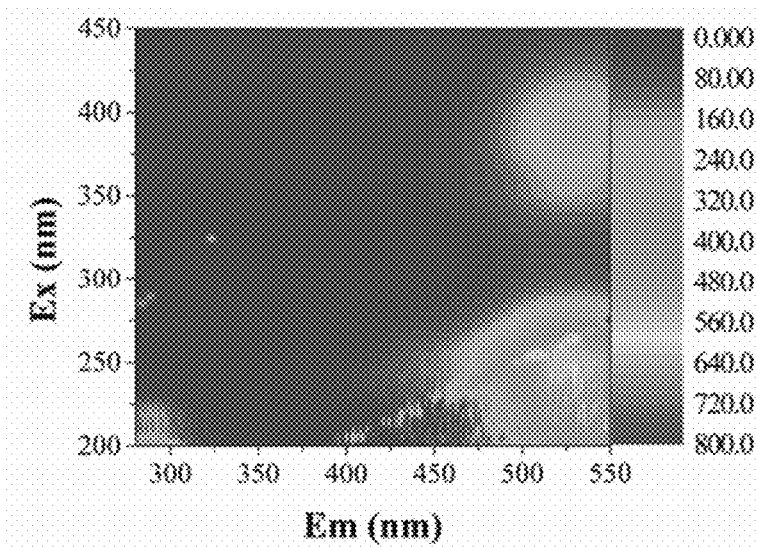
FIG. 1A and FIG. 1B are three-dimensional fluorescence diagrams of a fluorescent polycarboxylate superplasticizer prepared in embodiment 6 when concentrations of the fluorescent polycarboxylate superplasticizer are diluted into 4 ppm and 8 ppm, respectively.
Figure 1:
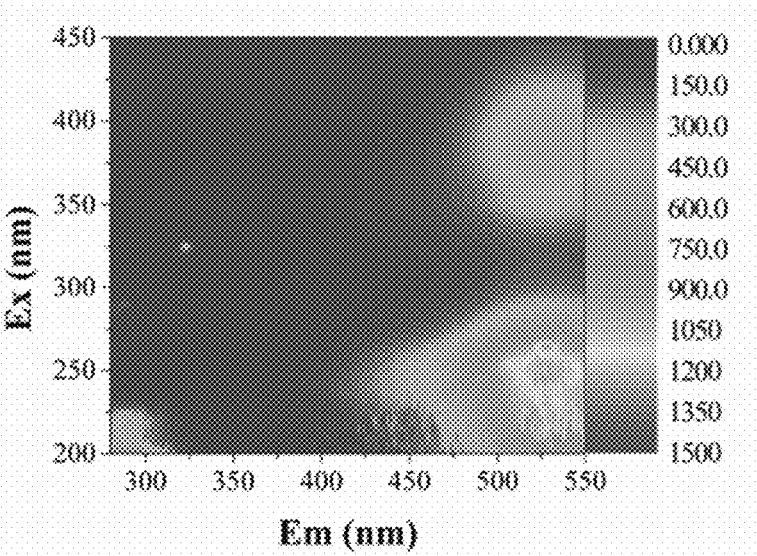

1) A redox radical polymerization reaction was performed on 2 mol of acrylic acid and 1 mol of allyl polyethylene glycol (having a weight-average molecular weight of 300) at a temperature of 5° C. for 5 hours under a combined action of 0.1 mol of hydrogen peroxide, 0.05 mol of sodium formaldehyde sulfoxylate and 0.03 mol of 2-mercaptopropionic acid to obtain a polycarboxylate superplasticizer pre-product; and 2) 1 mol of the polycarboxylate superplasticizer pre-product obtained in the step 1) was subjected to an esterification reaction with 10 mol of N-(hydroxyethyl) carbazole having a fluorescent property under an action of 0.1 mol of solid acid for 5 hours, then a pH was adjusted to 7 with potassium hydroxide, and water was added to obtain a fluorescent polycarboxylate superplasticizer having a concentration of 60% by weight and a weight-average molecular weight of 20,000.

Embodiment 2

1) A redox radical polymerization reaction was performed on 3 mol of methacrylic acid and 1 mol of methallyl polyethylene glycol (having a weight-average molecular weight of 800) at a temperature of 15° C. for 4 hours under a combined action of 0.08 mol of ammonium persulfate, 0.1 mol of sodium sulfite and 0.04 mol of mercaptoethanol to obtain a polycarboxylate superplasticizer pre-product; and 2) 1 mol of the polycarboxylate superplasticizer pre-product obtained in the step 1) was subjected to an esterification reaction with 7 mol of N-(hydroxymethyl) carbazole having a fluorescent property under an action of 0.08 mol of concentrated sulfuric acid for 3 hours, then a pH was adjusted to 6 with sodium hydroxide, and water was added to obtain a fluorescent polycarboxylate superplasticizer having a concentration of 50% by weight and a weight-average molecular weight of 40,000.

Embodiment 3

1) A redox radical polymerization reaction was performed on 4 mol of sodium acrylate and 1 mol of 3-methyl-3-butene-1-polyethylene glycol (having a weight-average molecular weight of 1000) at a temperature of 25° C. for 3 hours under a combined action of 0.06 mol of sodium persulfate, 0.15 mol of sodium metabisulfite and 0.05 mol of dodecyl mercaptan to obtain a polycarboxylate superplasticizer pre-product; and 2) 1 mol of the polycarboxylate superplasticizer pre-product obtained in the step 1) was subjected to an esterification reaction with 6 mol of 9-(p-hydroxymethyl) phenyl carbazole having a fluorescent property under an action of 0.03 mol of p-toluenesulfonic acid for 4 hours, then a pH was adjusted to 6.5 with calcium hydroxide, and water was added to obtain a fluorescent polycarboxylate superplasticizer having a concentration of 50% by weight and a weight-average molecular weight of 50,000.

Embodiment 4

1) A redox radical polymerization reaction was performed on 5 mol of sodium methacrylate, 1 mol of 2-methylallyl polyethylene glycol (having a weight-average molecular weight of 1200) at a temperature of 35° C. for 3 hours under a combined action of 0.04 mol of potassium persulfate, 0.1 mol of sodium hydrogen sulfite and 0.1 mol of sodium methyl propenyl sulfonate to obtain a polycarboxylate superplasticizer pre-product; and 2) 1 mol of the polycarboxylate superplasticizer pre-product obtained in the step 1) was subjected to an esterification reaction with 5 mol of 9-(o-hydroxymethyl) phenyl carbazole having a fluorescent property under an action of 0.04 mol of tetrabutyl titanate for 4.5 hours, then a pH was adjusted to 7 with potassium hydroxide, and water was added to obtain a fluorescent polycarboxylate superplasticizer having a concentration of 50% by weight and a weight-average molecular weight of 60,000.

Embodiment 5

1) A redox radical polymerization reaction was performed on 3 mol of acrylamide and 1 mol of methoxy polyethylene glycol methacrylate (having a weight-average molecular weight of 3000) at a temperature of 30° C. for 3 hours under a combined action of 0.05 mol of hydrogen peroxide, 0.15 mol of ferrous pyrophosphate and 0.08 mol of 3-mercaptopropionic acid to obtain a polycarboxylate superplasticizer pre-product; and 2) 1 mol of the polycarboxylate superplasticizer pre-product obtained in the step 1) was subjected to an esterification reaction with 5 mol of 9-(m-hydroxymethyl) phenyl carbazole having a fluorescent property under an action of 0.05 mol of a catalyst for 3.5 hours, then a pH was adjusted to 6 with sodium hydroxide, and water was added to obtain a fluorescent polycarboxylate superplasticizer having a concentration of 60% by weight and a weight-average molecular weight of 70,000.

Embodiment 6

1) A redox radical polymerization reaction was performed on 4 mol of methacrylamide and 1 mol of methoxy polyethylene glycol acrylate (having a weight-average molecular weight of 5000) at a temperature of 10° C. for 5 hours under a combined action of 0.03 mol of ammonium persulfate, 0.2 mol of ferrous sulfate and 0.07 mol of thioglycolic acid to obtain a polycarboxylate superplasticizer pre-product; and 2) 1 mol of the polycarboxylate superplasticizer pre-product obtained in the step 1) was subjected to an esterification reaction with 4 mol of (4-carbazol-9-methyl-cyclohexyl)-methanol having a fluorescent property under an action of 0.06 mol of trifluoromethanesulfonic acid for 3 hours, then a pH was adjusted to 7 with potassium hydroxide, and water was added to obtain a fluorescent polycarboxylate superplasticizer having a concentration of 40% by weight and a weight-average molecular weight of 80,000.

Embodiment 7

1) A redox radical polymerization reaction was performed on 5 mol of potassium acrylate and 1 mol of polyethylene glycol monoacrylate (having a weight-average molecular weight of 8000) at a temperature of 45° C. for 5 hours under a combined action of 0.06 mol of sodium persulfate, 0.1 mol of sodium hypophosphite and 0.03 mol of mercaptoethanol to obtain a polycarboxylate superplasticizer pre-product; and 2) 1 mol of the polycarboxylate superplasticizer pre-product obtained in the step 1) was subjected to an esterification reaction with 3 mol of (3-carbazol-9-methyl-cyclohexyl)-methanol having a fluorescent property under an action of 0.07 mol of DCC/DMAP for 3-5 hours, then a pH was adjusted to 6 with sodium hydroxide, and water was added to obtain a fluorescent polycarboxylate superplasticizer having a concentration of 30% by weight and a weight-average molecular weight of 45,000.

Embodiment 8

1) A redox radical polymerization reaction was performed on 6 mol of 4-vinylbenzoic acid and 1 mol of polyethylene glycol methacrylate (having a weight-average molecular weight of 6000) at a temperature of 35° C. for 5 hours under a combined action of 0.07 mol of potassium persulfate, 0.02 mol of sodium ascorbate and 0.1 mol of 2-mercaptopropionic acid to obtain a polycarboxylate superplasticizer pre-product; and 2) 1 mol of the polycarboxylate superplasticizer pre-product obtained in the step 1) was subjected to an esterification reaction with 1 mol of (2-carbazol-9-methyl-cyclohexyl)-methanol having a fluorescent property under an action of 0.01 mol of p-toluenesulfonic acid for 3 hours, then a pH was adjusted to 6.5 with sodium hydroxide, and water was added to obtain a fluorescent polycarboxylate superplasticizer having a concentration of 20% by weight and a weight-average molecular weight of 35,000.

Performance Test

1. Paste Fluidity Test

The samples obtained from embodiments 1-8 were respectively subjected to a paste fluidity test according to Chinese standard GB8077-2000: Methods for Testing Uniformity of Concrete Admixture. The water cement ratio (W/C) is 0.29, and an adding amount of the admixture, converted into a solid content, is 0.15% of an amount of cement.

TABLE 1

Paste fluidity and fluidity loss of each sample

| Sample | Adding amount of admixture | Paste fluidity/mm | | |
|---|---|---|---|---|
| | | 0 h | 0.5 h | 1.0 h |
| 1 | 0.15% | 220 | 205 | 195 |
| 2 | | 225 | 210 | 185 |
| 3 | | 215 | 205 | 180 |
| 4 | | 215 | 200 | 185 |
| 5 | | 220 | 210 | 195 |
| 6 | | 220 | 210 | 200 |
| 7 | | 230 | 205 | 195 |
| 8 | | 210 | 200 | 190 |

From the above data, we can see that the fluorescent polycarboxylate superplasticizer has no adverse effect on the cement paste fluidity.

2. Concrete Performance Test

The samples obtained from embodiments 1-8 were respectively subjected to a slump loss test and a concrete strength test according to Chinese standard GB8076-2008: Concrete Admixture. An adding amount of the admixture, converted into a solid content, is 1.5% by weight (relative to the amount of cement).

TABLE 2

Slump loss resistant properties and mechanical properties of each sample

| Sample | Adding amount of admixture | Cement | Slump (mm)/ Slump flow (mm) | | Compressive strength/MPa | | |
|---|---|---|---|---|---|---|---|
| | | | 0 h | 1 h | 3 d | 7 d | 28 d |
| 1 | 1.5% | Reference cement | 225/545 | 205/510 | 26.4 | 36.1 | 48.6 |
| 2 | | | 235/550 | 210/535 | 27.3 | 37.1 | 49.3 |
| 3 | | | 225/565 | 205/525 | 26.9 | 37.3 | 49.2 |
| 4 | | | 225/575 | 210/545 | 27.8 | 36.8 | 49.0 |
| 5 | | | 230/560 | 215/530 | 26.2 | 37.2 | 48.2 |
| 6 | | | 235/550 | 215/525 | 27.1 | 36.8 | 47.5 |
| 7 | | | 230/570 | 200/540 | 26.7 | 35.9 | 47.6 |
| 8 | | | 235/565 | 220/550 | 29.0 | 37.3 | 47.7 |

From the above data, we can see that the fluorescent polycarboxylate superplasticizer has no adverse effect on concrete strength.

3. Fluorescence Performance Test

The sample of embodiment 6 was diluted with deionized water to 4 ppm and 8 ppm, respectively. Three-dimensional fluorescence excitation-emission matrix (EEM) was performed by using the Hitachi F-7000 fluorescence spectrophotometer. A scanning range of the Hitachi F-7000 fluorescence spectrophotometer was set as follows. An excitation wavelength (Ex) was set as 200-400 nm, an emission wavelength (Em) was set as 280-550 nm, and step values were set as 5 nm and 1 nm, respectively. The three-dimensional fluorescence diagrams corresponds to FIG. 1A and FIG. 1B, respectively.

Conclusion: it can be seen that the sample of embodiment 6 has relatively strong fluorescence performance even at a relatively low concentration, showing that the fluorescence performance of the fluorescent polycarboxylate superplasticizer is remarkable.

What is claimed is:
1. A preparation method of a fluorescent polycarboxylate superplasticizer, comprising the following steps:
   1) performing a redox radical polymerization reaction on a monomer of an unsaturated acid and a derivative of the unsaturated acid, and an unsaturated polyether monomer at a temperature of 5-45° C. for 3-5 hours under a combined action of an initiator, a reducing agent and a chain transfer agent to obtain a polycarboxylate superplasticizer pre-product; wherein, a molar ratio of the unsaturated polyether monomer, the monomer of the unsaturated acid and the derivative of the unsaturated acid, the initiator, the reducing agent and the chain transfer agent is 1:(2-6):(0.01-0.1):(0.02-0.2): (0.03-0.1); and
   2) performing an esterification reaction on the polycarboxylate superplasticizer pre-product and an organic molecule having a fluorescent property under an action of a catalyst for 3-5 hours, then adjusting a pH to 6-7 with an alkali solution, and adding water to obtain the fluorescent polycarboxylate superplasticizer with a concentration of 5%-60% by weight; wherein, a molar ratio of the polycarboxylate superplasticizer pre-product, the organic molecule having the fluorescent property, and the catalyst is 1:(1-10):(0.01-0.1).

2. The preparation method of claim 1, wherein the unsaturated polyether monomer in the step 1) is at least one item selected from the group consisting of allyl polyethylene glycol, methallyl polyethylene glycol, 3-methyl-3-butene-1-polyethylene glycol, 2-methylallyl polyethylene glycol, methoxy polyethylene glycol methacrylate, methoxy polyethylene glycol acrylate, polyethylene glycol monoacrylate and polyethylene glycol methacrylate, and a weight-average molecular weight of the unsaturated polyether monomer is 300-8000.

3. The preparation method of claim 1, wherein the monomer of the unsaturated acid and the derivative thereof in the step 1) is at least one item selected from the group consisting of acrylic acid, methacrylic acid, sodium acrylate, sodium methacrylate, acrylamide, methacrylamide, potassium acrylate, potassium methacrylate and 4-vinylbenzoic acid.

4. The preparation method of claim 1, wherein in the step 1), the initiator is at least one item selected from the group consisting of hydrogen peroxide, ammonium persulfate, sodium persulfate and potassium persulfate; the reducing agent is at least one item selected from the group consisting of sodium formaldehyde sulfoxylate, sodium sulfite, sodium metabisulfite, sodium hydrogen sulfite, ferrous pyrophosphate, ferrous sulfate, sodium hypophosphite and sodium ascorbate; and the chain transfer agent is at least one item selected from the group consisting of thioglycolic acid, mercaptoethanol, 2-mercaptopropionic acid, 3-mercaptopropionic acid, sodium methyl propenyl sulfonate and dodecyl mercaptan.

5. The preparation method of claim 1, wherein the organic molecule having the fluorescent property in the step 2) is at least one item selected from the group consisting of N-(hydroxymethyl) carbazole, N-(hydroxyethyl) carbazole, 9-(p-hydroxymethyl) phenyl carbazole, 9-(o-hydroxymethyl) phenyl carbazole, 9-(m-hydroxymethyl) phenyl carbazole, (4-carbazole-9-methyl-cyclohexyl)-methanol, (3-carbazole-9-methyl-cyclohexyl)-methanol, and (2-carbazole-9-methyl-cyclohexyl)-methanol.

6. The preparation method of claim 1, wherein the catalyst in the step 2) is at least one item selected from the group consisting of solid acid, concentrated sulfuric acid, p-toluenesulfonic acid, tetrabutyl titanate, dicyclohexylcarbodiimide/4-dimethylaminopyridine (DCC/DMAP), and trifluoromethanesulfonic acid.

7. The preparation method of claim 1, wherein the alkali solution in the step 2) is at least one item selected from the group consisting of potassium hydroxide, sodium hydroxide and calcium hydroxide.

* * * * *